United States Patent
Marmur et al.

(10) Patent No.: US 7,139,477 B2
(45) Date of Patent: Nov. 21, 2006

(54) METHOD AND SYSTEM FOR DIVERTING TRAFFIC IN A COMMUNICATION NETWORK

(75) Inventors: Oren Marmur, Kiryat Ono (IL); Ido Gur, Rishon Lezion (IL); Aviv Ben-Zeev, Tel Aviv (IL)

(73) Assignee: ECI Telecom Ltd., Petach Tikva (IL)

( * ) Notice: Subject to any disclaimer, the term of this patent is extended or adjusted under 35 U.S.C. 154(b) by 620 days.

(21) Appl. No.: 10/139,739

(22) Filed: May 7, 2002

(65) Prior Publication Data

US 2002/0171892 A1 Nov. 21, 2002

Related U.S. Application Data

(63) Continuation-in-part of application No. 09/500,823, filed on Feb. 10, 2000.

(30) Foreign Application Priority Data

Nov. 3, 1999 (IL) .................................. 132727

(51) Int. Cl.
*H04B 10/00* (2006.01)
(52) U.S. Cl. .............................. 398/17; 398/10; 398/33
(58) Field of Classification Search ................ 398/1–38
See application file for complete search history.

(56) References Cited

U.S. PATENT DOCUMENTS

| 4,393,493 A | 7/1983 | Edwards |
| 5,361,263 A | 11/1994 | Urbansky |
| 5,933,258 A | 8/1999 | Flanagan et al. |
| 6,005,694 A * | 12/1999 | Liu ................................. 398/6 |
| 6,195,186 B1 | 2/2001 | Asahi |
| 6,262,820 B1 * | 7/2001 | Al-Salameh ................. 398/12 |
| 6,433,900 B1 * | 8/2002 | Kuroyanagi et al. .......... 398/19 |

FOREIGN PATENT DOCUMENTS

| EP | 0 938 244 A2 | 8/1999 |
| WO | WO 97/24822 | 7/1997 |
| WO | WO 98/34363 | 8/1998 |

OTHER PUBLICATIONS

Chung-Sheng Li et al; "Automatic Fault Detection, Isolation, and Recovery in Transparent All-Optical Networks"; Journal of Lightwave Technology, IEEE, New York, U.S. vol. 15, No. 10, Oct. 1, 1997.

(Continued)

*Primary Examiner*—David C. Payne
(74) *Attorney, Agent, or Firm*—Browdy and Neimark, PLLC (57) ABSTRACT

A method for diverting communication traffic in an optical network from a first optical link extending between a first and a second locations, to a second optical link extending either directly between the first and the second locations or via a third location, which method comprises the steps of switching traffic at said first location from said first optical link to said second optical link. After determining at the second location that traffic has not been received along the first optical link for a pre-determined period of time, traffic is diverted at the second location to the second optical link.

1 Claim, 8 Drawing Sheets

OTHER PUBLICATIONS

Grover et al, "A Proposal to Use the Justification Bits of a DS-3 Stream for Signaling" IEEE Transactions on Communications, (1990). 38(10): 1657-1658.

Yasuda et al, "Automated Network Connection Tracing and Data Gathering Methods Using Overhead Bytes in the SDH Frame Structure", Communications-Rising to the Heights. Denver, Jun. 23-26, 1991. Proceedings of the International Conference on Communications. vol. 1, Jun. 23, 1991, pp. 33-38.

Young, Marvin, "Current Views of Restoration at the Optical Layer". IEEE, (1998). pp. 249-250.

* cited by examiner

METHOD AND SYSTEM FOR DIVERTING TRAFFIC IN A COMMUNICATION NETWORK

This is a continuation-in-part of copending parent application Ser. No. 09/500,823, filed Feb. 10, 2000.

FIELD OF THE INVENTION

The present invention relates in general to optical networks, and in particularly to optical telecommunication networks and to methods of using them.

BACKGROUND OF THE INVENTION

Telecommunication systems comprising a number of optical transmission channels are well known in the art. The need to switch sometimes from one traffic carrying path to another arises e.g. when there is an occasional fault occurring in one of the traffic carrying channels, due to failing components, or when an expansion of the operating communication network is required. Therefore, an auxiliary channel is usually incorporated in such systems, allowing the diversion of traffic transmitted to another channel, which is sometimes referred to as the protection channel. Traditionally, monitoring the performance in these telecommunication systems was done by incorporating various alarm conditions. Such alarm conditions alerted a human operator when certain events e.g. a loss of signal or error rates that had exceeded pre-defined thresholds were detected. In response to such an alarm, the operator would manually switch to a redundant path in the network, allowing the communication to continue.

At a later stage, conventional fiber optic fibers have implemented 1:1 redundancy for the optical channels in a network, with a certain amount of automatic switching. In these systems, when a loss of signal (to be referred to hereinafter as "LOS") or alarm indication signal ("AIS") conditions were noted in a channel connecting two locations, a diversion of the transmission to the available redundant path was made. This diversion enables the transmission of data between these two locations to continue.

U.S. Pat. No. 4,646,286 discloses a system wherein a protection switch is effected by detecting a channel failure at the receiving end. Thereafter, a protection request is transmitted on the return channel towards the transmission end. This request is then used in a controller for the channel to activate a switch to the corresponding protection channel. Similarly, WO 97/24822 discloses the use of distinctive optical signals indicating detection of fault in order to allow a switch to a protection link.

However, since this solution requires doubling both the cabling and the input/output ports as compared with those required for carrying live traffic, such a solution is considered to be a rather expensive solution.

Another solution was described in U.S. Pat. No. 5,479,608 that discloses a telecommunication system having 1:N group protection. By this type of solution one redundant channel is allocated to protect a number of operative channels. According to this solution, in response to the detection of an error condition, a request is transmitted to the other side of the system to activate the protection channel.

Chung-Sheng Li in "Automatic Fault Detection, Isolation, and Recovery in Transport All-Optical Networks" J. of Lightwave Tech., IEEE, Vol. 15, 1784–1793, 1997 describes the use a separate supervisory channel using either independent wavelength or a subcarrier channel wherein a pilot tone provides information for fault management.

SUMMARY OF THE INVENTION

It is an object of the present invention to provide an optical system that allows continued transmission of messages in case of a failure in a transmission path by using an alternative transmission path.

It is yet another object of the present invention to provide a system that comprises a combination of protection means and means for automatic system shut down.

It is still another object of the present invention to provide method for diverting transmission from a failing transmission path to an alternative protection path.

Another object of the present invention is to provide an optical device that allows continued transmission of live traffic during the expansion of the optical network to include additional elements.

Still another object of the present invention is to provide a method for diverting transmission to and from alternative transmission paths.

Other objects of the invention will become apparent as the description of the invention proceeds.

In accordance with an embodiment of the present invention, there is provided a method for diverting communication traffic in an optical transport network which comprises a first optical transmission link and a first optical reception link extending between a first and a second locations and carrying traffic in normal operation mode from the first location to the second location, and a second transmission link and a second reception link adapted to carry traffic diverted from the first optical transmission and reception links in the event of a fault in at least one of the two first optical links, which method comprises the steps of:

detecting a fault on a first optical link at the second location;

determining whether a total of the energy received over the first reception optical link at the second location exceeds a pre-defined threshold;

in the case that the total energy thus received does not exceed the pre-defined threshold, diverting the traffic transmission and reception at the second location to the corresponding second links;

detecting a fault on a first optical link at the first location;

determining whether a total of the energy received via the first optical link at the first location exceeds a pre-defined threshold; and in the case that the total energy thus received does not exceed the pre-defined threshold, diverting the traffic transmission and reception at the first location to the corresponding second links.

In accordance with another embodiment of the present invention there is provided in an optical transport network comprising a plurality of telecommunication channels extending between first and second locations, the channels comprising a plurality of channels for carrying traffic in normal operation mode from the first location to the second location and at least one protection channel for carrying traffic channel in the event of a fault in at least one of the channels carrying traffic in normal operation mode, a method for managing routing of traffic to the protection channel, comprising the steps of:

detecting a fault on at least one of the channels carrying traffic in normal operation mode, at the second location;

switching at the second location the transmission and reception paths associated with said at least one failing channel to the at least one protection channel;

detecting a fault on said at least one channel at the first location; and switching at the first location the transmission and reception paths associated with said at least one failing channel to the at least one protection channel.

According to yet another embodiment of the present invention the at least one protection channel is used for protecting one pre-designated channel of the plurality of telecommunication channels.

In accordance with another embodiment of the invention the at least one protection channel is used for protecting a plurality of telecommunication channels.

By still another embodiment of the invention there is provided a method for allowing continuous operation of non-failing channels provided that the overall transmitted energy in the non-failing channels exceeds a pre-defined threshold in an optical transport network comprising a plurality of telecommunication channels extending between first and second locations, the channels comprising a plurality of channels for carrying traffic from the first location to the second location, at least one protection channel for carrying the traffic of at least one forward channel in the event of fault in said at least one forward channel.

In accordance with yet another embodiment of the present invention there is provided a method for diverting communication traffic in an optical network from a first optical link comprising a first transmission link and a first optical reception link and extending between a first and a second locations, to a second optical link comprising a second transmission link and a second reception link and extending between a first and a second locations via a third location, which method comprises the steps of:

switching traffic at the first location from the first optical link to the second optical link;

determining at the second location that traffic has not been received along the first optical link for a for a pre-determined period of time from about 10 msec to about 50 msec;

in response to determining that traffic has not been received along the first optical link for the pre-determined period of time, diverting traffic at the second location to the second optical link.

As will be appreciated by those skilled in the art this embodiment may be applied to include another network element located physically at a different location, but could also be applied to include an additional equipment e.g. an Add and Drop Multiplexer ("ADM"), where this equipment is physically located for example at the first or at the second locations. The use of the term "third location" as referred to herein, should be understood to encompass both these types of operation.

According to a preferred embodiment of the invention the determination that traffic has not been received along the first optical link is based on the determination that a total of the energy received via the first optical link at the first location does not exceed a pre-defined threshold.

According to another preferred embodiment of the invention, the determination that traffic has not been received along the first optical link is based on the detection of LOS (Loss of Signal) indication.

By yet another preferred embodiment of the invention, traffic is diverted at the second location to the second optical link if traffic has not been received from the first optical link for a period of time of between about 25 msec to about 50 msec.

According to still another embodiment of the invention, the step of switching traffic path at the first location from the first optical link to the second optical link, comprises the following steps:

switching traffic at the first location from the first optical reception link to the second optical reception link;

switching traffic at the first location from the first optical transmission link to the second optical transmission link in response to switching from the first optical reception link to the second optical reception link at that first location.

In accordance with another aspect of the invention there is provided a communication device comprising:

a switch operative to divert traffic from a first optical link to a second optical link;

a detector operative to detect incoming traffic; and a processor operative to determine that traffic has not been received along the first optical link for a period of time from about 10 msec to about 50 msec.

According to another embodiment of the invention the communication device further comprises controlling means that in response to a determination that traffic has not been received along the first optical link for the pre-determined period of time made by the processor, are operative in controlling the switch operation to divert traffic.

In accordance with another aspect of the present invention, there is provided an optical communication system comprising:

a plurality of optical transmitters;

a wave division multiplexer receiving outputs from the plurality of optical transmitters over a plurality of optical channels;

at least a first and a second optical links;

a first switching means operative to allow diversion of traffic from the first optical link to the second optical link;

a wave division demultiplexer capable of receiving an input from the division multiplexer over the first optical link;

a plurality of optical receivers, each receiving an input from the wave division demultiplexer;

a detection means for detecting a loss of signal along the first optical link;

a second switching means operative to allow the wave division demultiplexer to receive input from the wave division multiplexer over the second optical link in response to detection of loss of signal along the first optical link.

According to an embodiment of the invention, the detection means comprising:

a detector capable of detecting the energy received by each of the optical receivers; and determination means for determining whether the energy of the input received from the wave division multiplexer exceeds a pre-defined threshold.

According to another embodiment of the invention, there is provided an optical transport network comprising a plurality of telecommunication channels extending between first and second locations, the channels comprising a plurality of forward channels for carrying traffic in normal operating mode from the first location to the second location, at least one protection channel for carrying the traffic of at least one forward channel in the event of fault in said at least one forward channel, wherein when a failure occurs in one or more of said telecommunication channels, a continued operation of the non-failing telecommunication channels is allowed, provided that the overall transmitted energy in said non-failing telecommunication channels exceeds a pre-defined threshold.

Preferably, the optical transport network of the invention comprises:

a plurality of optical transmitters;

a wave division multiplexer receiving outputs from said plurality of optical transmitters over a plurality of optical channels;

at least one pair of optical links comprising a transmission link and a reception link;

at least one pair of protection links comprising a transmission link and a reception link;

at least one protection channel;

a wave division demultiplexer capable of receiving an input from said division multiplexer over one of said transmission links;

a plurality of optical receivers, each receiving an input from said wave division demultiplexer;

a detection means for detecting a loss of signal in at least one failing channel out of the plurality of optical channels;

a determination means for determining whether the energy of the input received from said division multiplexer exceeds a pre-defined threshold;

a blocking means operative to block all laser beams leaving said wave division multiplexer responsive to a determination of said determination means that the energy thus received does not exceed the pre-defined threshold; and a protecting means operative to divert traffic from said at least one failing channel to said least one protection channel in the event of fault in said at least one forward channel, provided that the energy of the input received from said division multiplexer exceeds the pre-defined threshold.

According to still another embodiment of the invention, the system further comprises at least one other transmitter and at least one other detector. Operating these other transmitter and detector allows to continuously monitoring the operability of the optical fiber which is not currently being used for the transmission of telecommunication traffic. By this embodiment, the optical fiber that is not used for transmitting traffic, e.g. the fiber assigned for protection purposes, is being monitored either on a continuous basis or according to a pre-determined schedule. Such monitoring enables to detect problems that may prevent the non-used fiber (e.g. the fiber assigned for protection) from functioning properly when required (e.g. when the main optic fiber is damaged and traffic is to be switched to the protection fiber). This way, if that fiber is found to be mal-functioning, it can be timely repaired. According to a further preferred embodiment, once a switch in the traffic transmission takes place to the protection fiber, the mal-functioning main optical fiber, will now be monitored by the at least one other transmitter and at least one other detector, which may be different transmitter and/or detector, or the same ones used when the protection fiber was monitored. Once this main fiber is repaired, the system can immediately be notified and the traffic may resume its original transmission path (the main optical fiber), switching from the protection fiber (revertive protection).

BRIEF DESCRIPTION OF THE DRAWINGS

The present invention will be understood and appreciated more fully from the following detailed description, taken in conjunction with the drawings in which.

DETAILED DESCRIPTION OF THE INVENTION

Figure 1A:
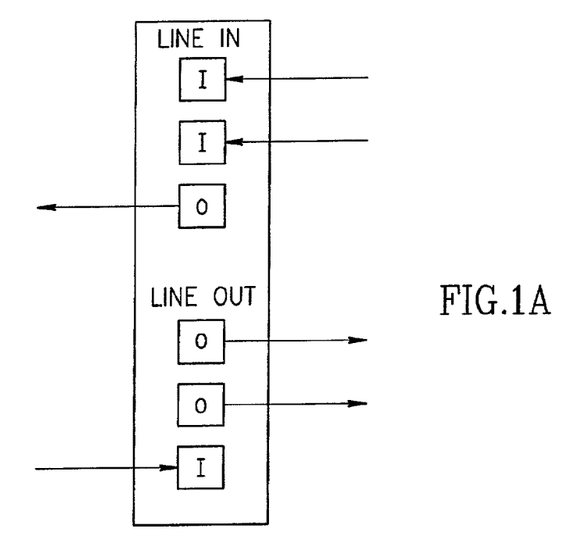
FIG. 1A illustrates a typical configuration of an optical protection module, where
Figure 1B:
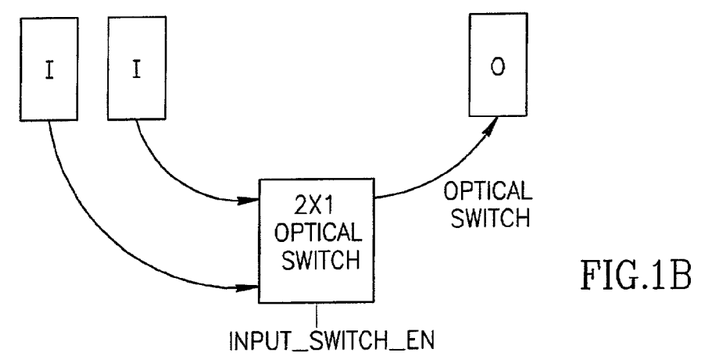
FIGS. 1B and 1C illustrate a configuration of an input optical switch and an output optical switch, respectively.
Figure 1C:
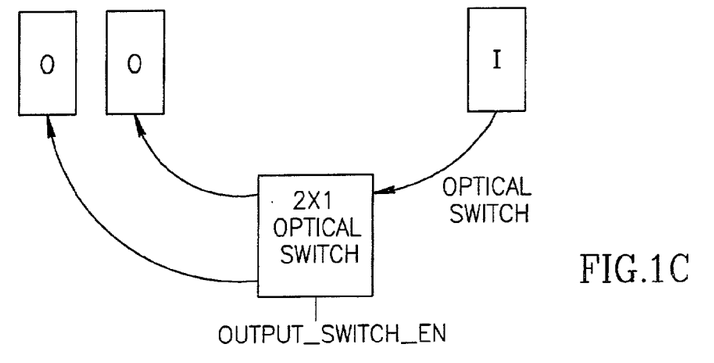

Reference is now made to FIG. 1, which illustrates schematically a preferred embodiment of a wave division multiplexing communications system constructed and operative in accordance with a preferred embodiment of the present invention.

The following example describes an Optical Protection Module (to be referred to hereinafter as "OPM") in accordance with the present invention. One of the main purposes of having such an OPM is to perform line protection and IO protection at the optical level, similarly to the SDH MSP 1+1 and IOP protections.

The OPM unit can be separated or an add-on unit to the LOS Detection unit. In the latter case, the need for additional LOS detection mechanisms and electrical control components is eliminated.

Typically, the OPM occupies a single CCP slot, forming together with the LOS Detection unit a double slot unit. The OPM unit includes two sets of fiber connectors, each containing 3 fibers. The first set includes 2 fiber inputs and 1 output, while the second set includes 1 fiber input and 2 outputs. Over all, the OPM unit receives 4 fiber from the line direction and 2 fibers from the LOS detection unit direction. FIG. 1A presents OPM card configuration.

The first set of optical fiber interfaces contains two fiber connectors for two fibers coming from the line direction (one operative and the other for protection), and one output fiber towards the LOS Detection unit card. The two input fibers are connected to a 2×1 optical switch, which alternately can connect each one of the input fibers to the output fibers.

FIG. 1B depicts the connection between the 2 input and one output fibers.

Similarly, the two output fibers of the second set of fiber interfaces are connected to another 2×1 optical switch, which can alternately connect each one of them to the single output fiber. FIG. 1C depicts the connection between the two output and one input fibers.

LOS detection is not required within the OPM unit itself, since the LOS Detection unit can perform the LOS detection operation. This way, the OPM card includes only the two optical switches, and no additional hardware is required.

The use of two optical switches, instead of an optical switch and an optical splitter is intended to avoid the power loss of 3–4 dB, in case the optical signal is splitted between the operative and protective fibers. As will be further shown, although switches are used at both ends, the protection mechanism can operate without exchanging information between the two ends of the network (such as an APS algorithm).

Figure 2:
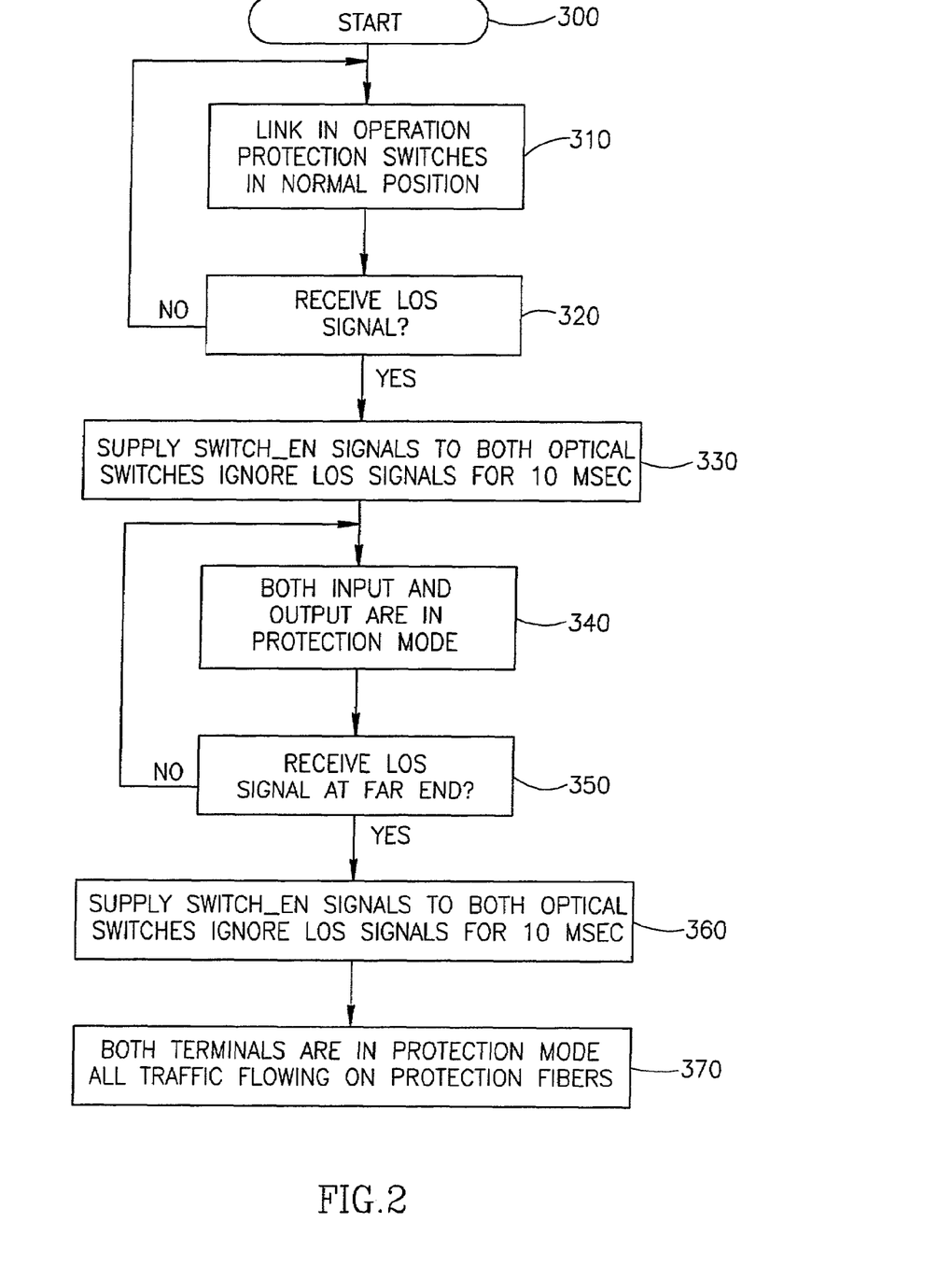
FIG. 2 is a flow chart describing a sequence of events occurring when a protection action is required.

FIG. 2 demonstrates a flow chart of a sequence of events taking place when a link failure occurs and a protective action is required.

Since the required LOS detection time is less than 1 msec, and the optical switch switching time should be under 4 msec, the whole protection procedure could be completed under 10 msec.

As previously explained, one type of optical protection is OMS/OTS layer protection. According to such type of protection, a set of multiplexed signals is protected between two adjacent optical network elements ("NE"). The protection procedure is somewhat similar so other ring protections known in the art, e.g. in SDH networks, but is carried out at the optical layer.

Another type of protection is the Och layer protection. The Och protection is provided for individual channels (wavelengths). In this case, separate channels are transmitted either on the operative or the protection fibers. Consequently, two different transponders may be required per channel. Contrary to the previous type of protection discussed, this type of protection is preferably carried out at the add and drop direction and not in the optical ring direction.

The following FIGS. 3A to 3D present the system operation scheme in normal operating mode as well as in the protection mode.

Figure 3A:
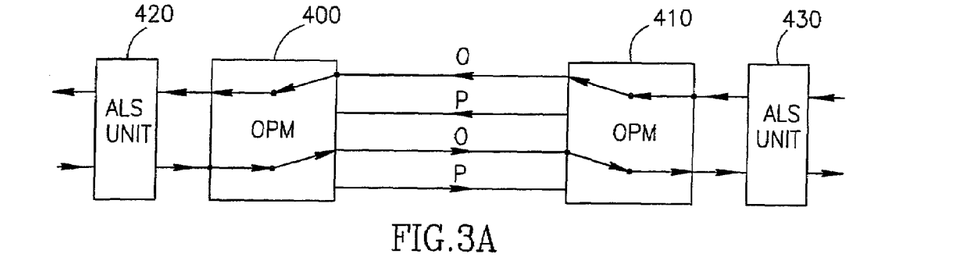
FIGS. 3A to 3D demonstrate operation of a system according to an embodiment of the present invention while switching from normal operating mode to a protection mode.

FIG. 3A presents the system in normal operation mode. The four fibers, two operative and two protection fibers are connected at both ends to OPM units 400 and 410, respectively, which in turn are connected to LOS Detection units 420 and 430, respectively.

Figure 3B:
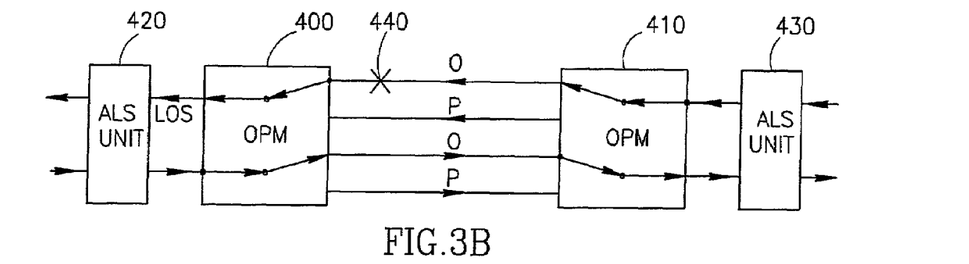
Figure 3C:
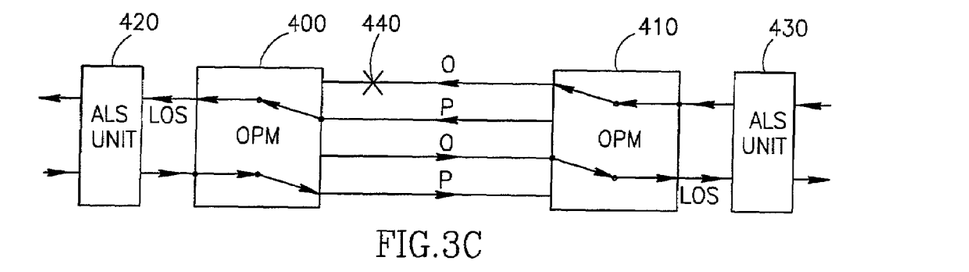

FIG. 3B illustrates the stage that a fiber break occurs in the point designated as 440. The fiber LOS is detected by the LOS Detection unit 420, which performs automatic shut down procedure. Once the shut down procedure is initiated, OPM 400 switches to protection mode as illustrated in FIG. 3C. Such a switch triggers a LOS in LOS Detection unit 430, and once this LOS is detected, OPM 410 will switch too to a protection mode (FIG. 3D), completing the system's required switch to the protection mode.

Figure 3D:
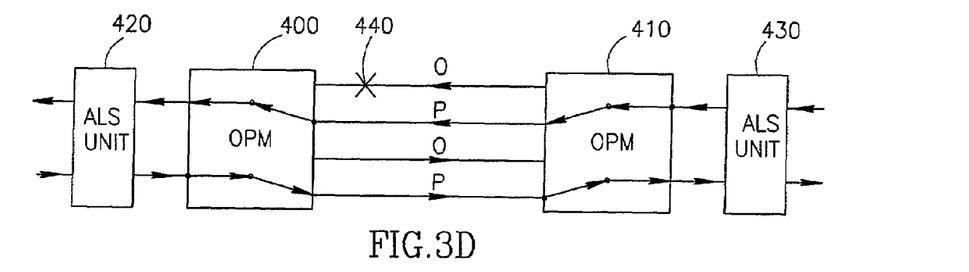

Following the second protection switching, all traffic is transmitted via the protection fibers. The entire operation is typically completed in less than 10 msec, and thus the LOS detection mechanism will not be triggered (an operation that typically requires about 600 msec). The protection fibers are now connected to LOS Detection unit and therefore if a fiber break occurs on one of the protection fibers, LOS detection will be triggered and will cause a shutdown of all traffic.

The OPM unit according to the present example comprises of the following main components:
6 SC fiber connectors, 3 inputs and 3 outputs.
2 2×1 optical switches.
DC Power supply.

No additional components are required in this Example since all the control circuitry is included in the LOS Detection unit.

Figure 4:
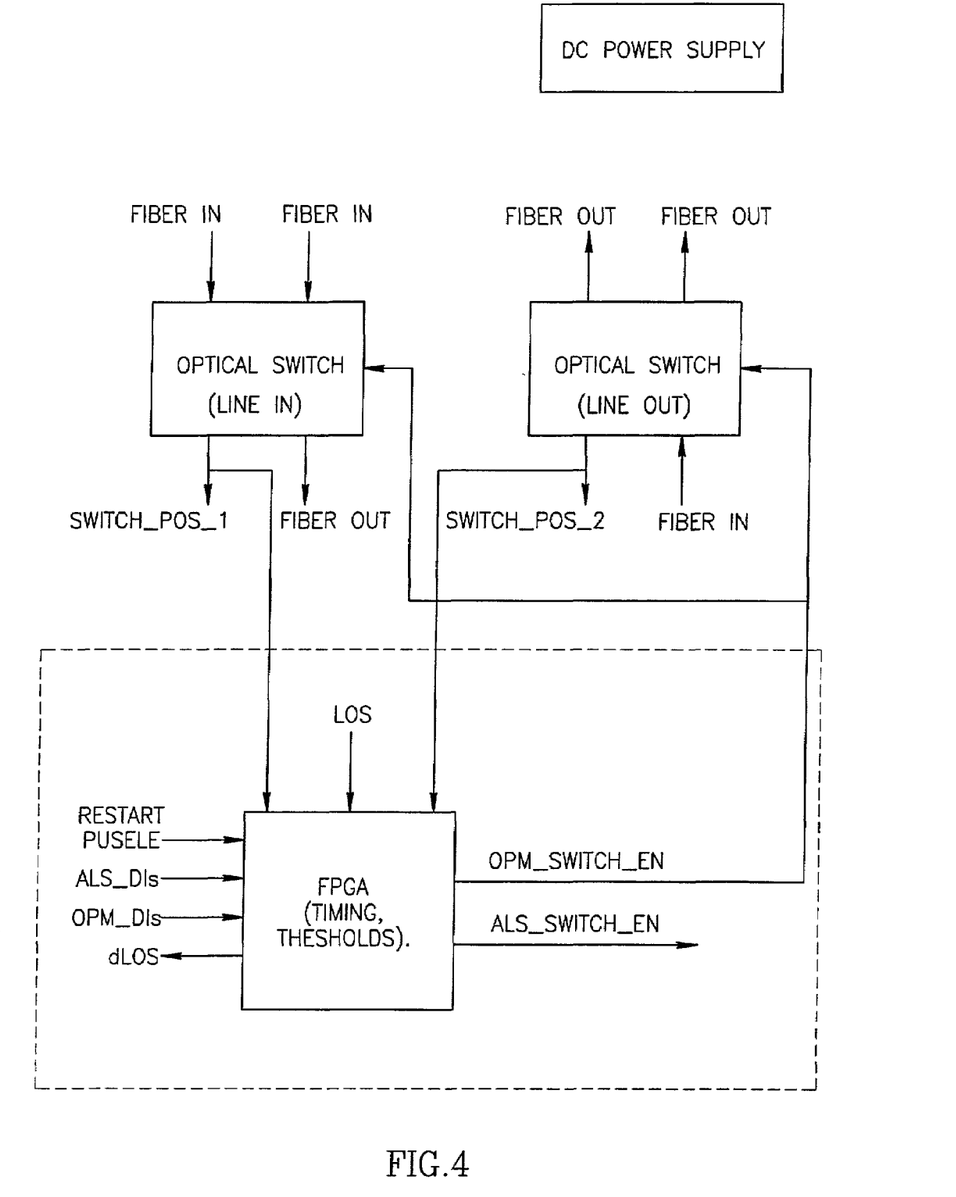
FIG. 4 presents a functional block diagram of an optical protection module according to an embodiment of the invention.

FIG. 4 presents a functional block diagram of the OPM unit. The figure presents the main functional blocks and their inter-relations, and should not be interpreted as a detailed and exact hardware layout.

As mentioned previously, LOS detection will be provided by the LOS Detection unit, through the control FPGA, which will be used for controlling the optical switched onboard the OPM card.

In order to control the OPM unit, additional outputs are required from FPGA onboard the LOS detection card. Therefore the FPGA is incorporated once again, including the additional signal.

Two main additional outputs are required—OPM_Switch_En and OPM switch position. The OPM_Switch_En signal controls the two optical switches and should change its value from 0 to 1 or from 1 to 0 upon LOS detection. As mentioned previously, the signal should be kept fixed for 10 msec, although LOS is still being detected, in order to enable completion of the protection action.

The following table 2 lists some relevant technical specification of the OPM unit.

TABLE 2 technical Specifications of the OPM unit

| Component | Parameter | Value | Units | Remarks |
|---|---|---|---|---|
| Optical Switch Unit | Insertion Loss | <0.5 | dB | |
| | Switching Time | <4 | msec | |
| | Switch_Pos | 0 - Switch in Normal Position 1 - Switch in Protect Position | | |
| FPGA | OPM_Switch_En Hold off time. | 10 | msec | Ignore LOS detection until completion of protection action. |

Figure 5A:
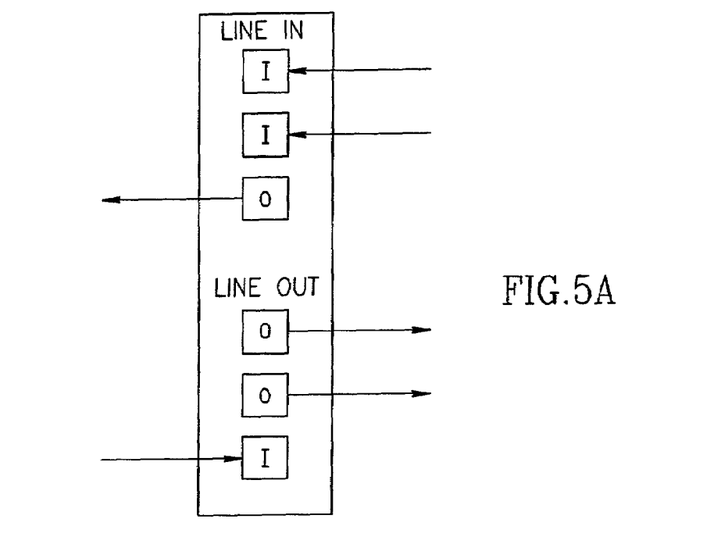
FIG. 5A illustrates a typical configuration of an optical protection module, where
Figure 5B:
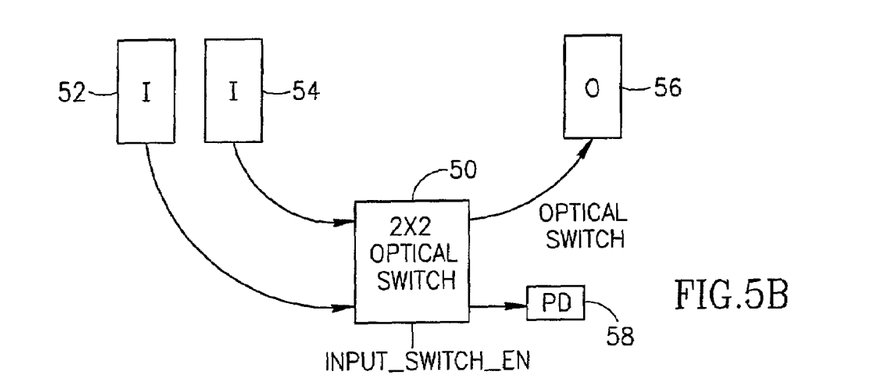
FIGS. 5B and 5C illustrate a configuration of an input optical switch and an output optical switch, respectively.
Figure 5C:
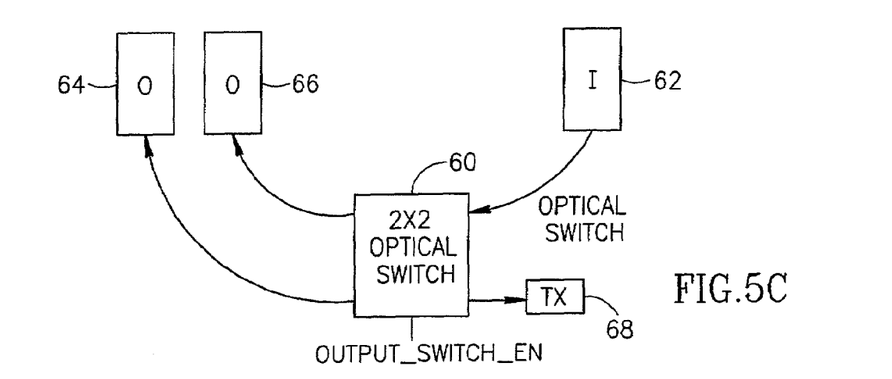

Another embodiment of the present invention is illustrated in FIGS. 5A and 5B. By this embodiment an input 2×2 optical switch 50 allows the connectivity of two incoming optical fibers 52 and 54 (one of which being the operative fiber and the other the protection fiber), to an outgoing optical fiber 56 and a photo-diode 58. The input fiber that is currently not connected to the outgoing fiber, is connected to a further receiver (photo-diode 58) for monitoring the fiber operability. Similarly, another 2×2 optical switch 60 is demonstrated in FIG. 5B, for use as an output switch. This switch allows the connectivity of one input optical fiber 62 to any one of the outgoing optical fibers 64 and 66. The outgoing fiber that is not currently connected to the incoming fiber is connected to transmitter 68. Preferably, low cost transmitter 68 and receiver 58 are used, and provide continuous monitoring of the fiber that is not used for traffic transmission. As was previously explained, such monitoring can be done either continuously, e.g. by transmitting low rate signals, or every pre-defined period of time. While operating, photo-diode 58 provides a monitor LOS signal, which is used to notify a detection of LOS of the optical fiber not currently used for transmission of traffic. According to still another preferred embodiment, no additional receiver is used, and the differentiation between real traffic and monitoring signals is done by their characteristics, e.g. change of power, rate, bandwidth and the like.

Figure 6:
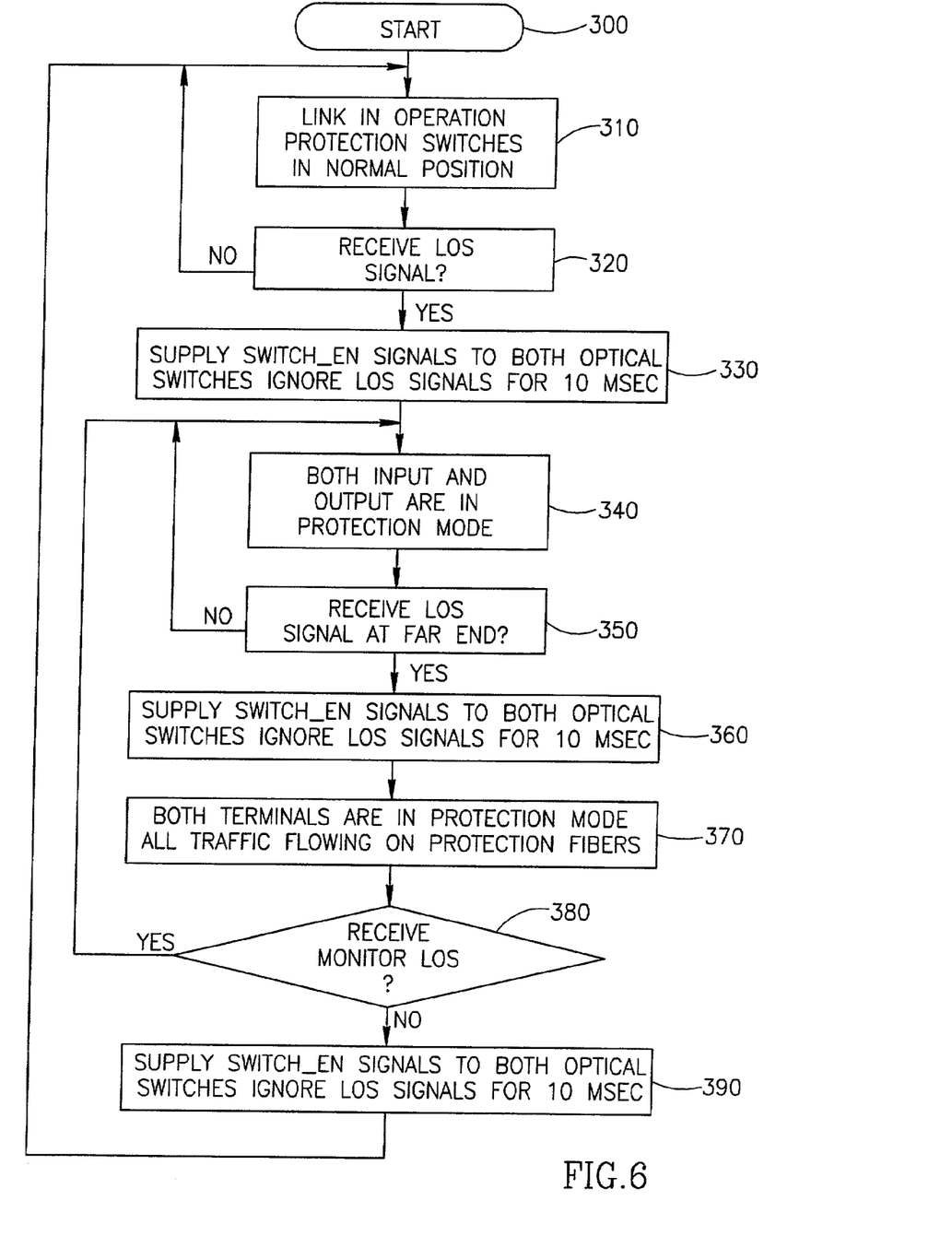
FIG. 6 presents a flow chart describing a sequence of events occurring when a protection action is required according to the embodiment illustrated in FIG. 5.

FIG. 6 which is an embodiment of the flow chart presented in FIG. 2, demonstrates a flow chart of a sequence of events taking place when a link failure occurs and a protective action is required, in the case where a monitoring of the non-used channel is carried out.

When an OPM as described above is used for expanding the communication network, it comprises a first set of optical fiber interfaces contains two fiber connectors for two fibers coming from the line direction. One operative, while the other is reserved for future expansion. As will be appreciated by a person skilled in the art, the connector reserved for future expansion, may be used for protection purposes in a way as described above, but as long as the required expansion has not been carried out. In that first set, also included is a connector for an output fiber extending towards the LOS Detection unit card. When carrying out the network expansion, the two input fibers are connected to a 2×1 optical switch, which alternately can connect each one of the input fibers to the output fibers.

As will be further shown, although these switches are used at both network elements which are apart from one another, the switching mechanism is not based on exchanging information between the two elements.

Figure 7:
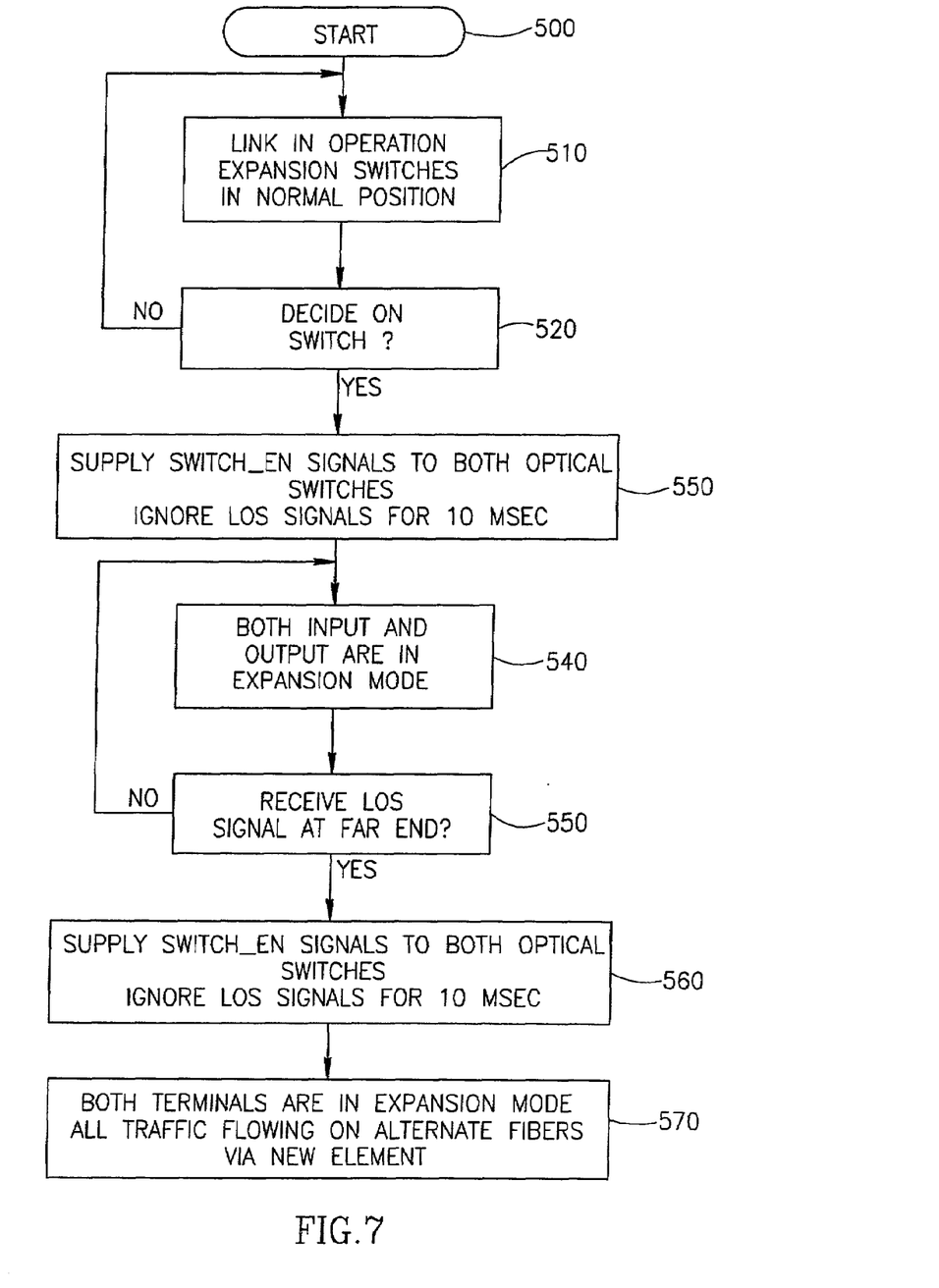
FIG. 7 presents a flow chart describing a sequence of events occurring when an expansion of the network is required.

FIG. 7 demonstrates an exemplified flow chart of a sequence of events taking place when traffic should be diverted to a second optical link while expanding the communication network.

The required LOS detection time is typically less than 1 msec, and the optical switch switching time should be under 4 msec, thus the whole switching procedure could be completed under 10 msec, and in any case well below the 50 msec currently allowed by International standards before declaring a failure in the optical network.

Reference is now made to FIGS. 8A to 8D, which illustrates schematically a preferred embodiment of an optical system operating before and after the expansion.

Figure 8A:
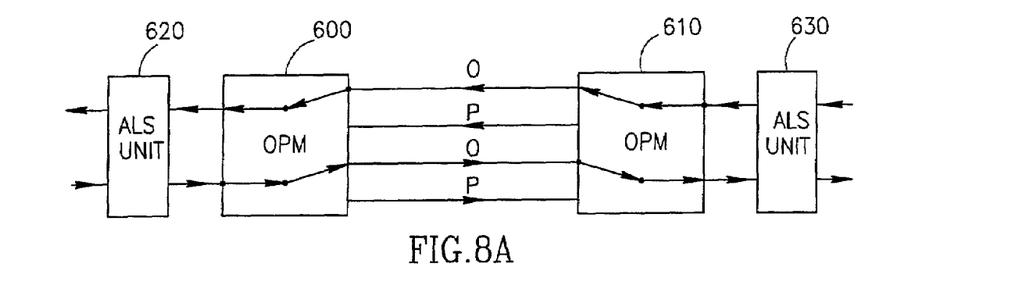
FIGS. 8A to 8D demonstrate operation of a system according to an embodiment of the present invention while switching from normal operating mode at the time of expansion.

FIG. 8A presents an example of a system in normal operation mode prior to its expansion to include a new network element. In this example, the resources reserved for carrying out the required expansion (the reserved connectors) are utilized by using the two fibers designated by "P" and extending between OPMs 600 and 610, for protection purposes. In this four fiber configuration, two of the fibers are operative (designated by "O") as well as the two additional ones, the protection fibers, are all connected at their ends to OPM units 600 and 610, respectively. OPM units 600 and 610, are in turn connected to LOS Detection units 620 and 630, respectively. As was previously explained, before the expansion takes place, these two additional fibers (if installed) may be used for protection purposes in the way explained above. However, as will be appreciated by those skilled in the art, until the expansion is required, there is no need to actually install the two additional "P" fibers. In the case the "P" fibers are not installed, the OPM units will be used in accordance with the present invention only when the expansion of the network to include a further network element is required.

Figure 8B:
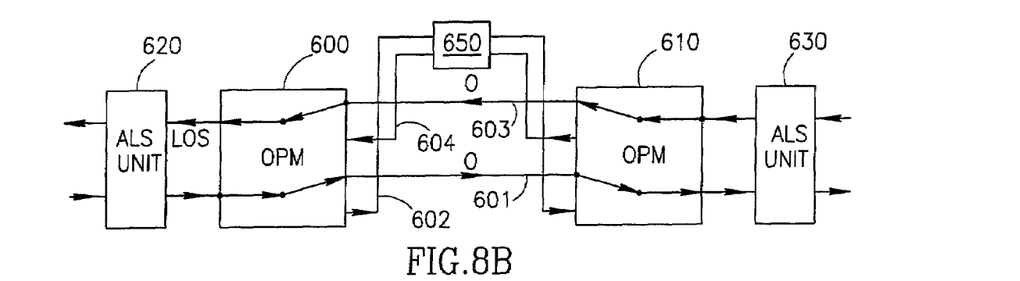
Figure 8C:
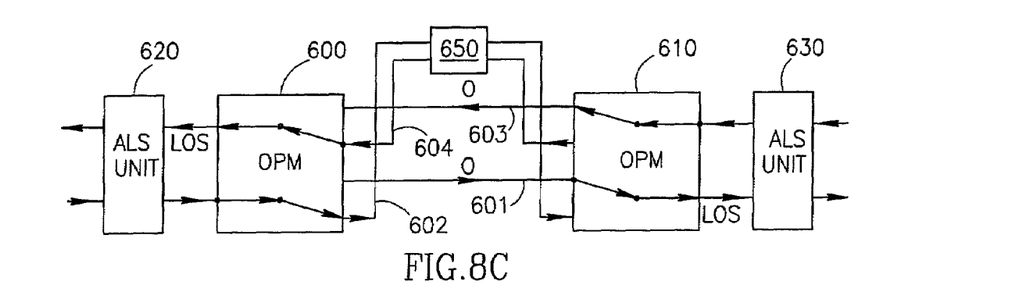

FIG. 8B illustrates the stage wherein the network is expanded to include element 650. Once the switching procedure is initiated at OPM 600, traffic is switched to the alternative link as illustrated in FIG. 8C. Such a switch triggers a LOS in LOS Detection unit 630. Once this LOS is detected, OPM 610 will switch too to the alternative link (FIG. 8D), completing the system's switch to include new element 650 in the network. Needless to say that from this stage onward, irrespective whether or not the OPM units 600 and 610 were used to provide protection for the traffic exchanged between the network elements comprising them, such protection will no longer be provided at the optical level.

Figure 8D:
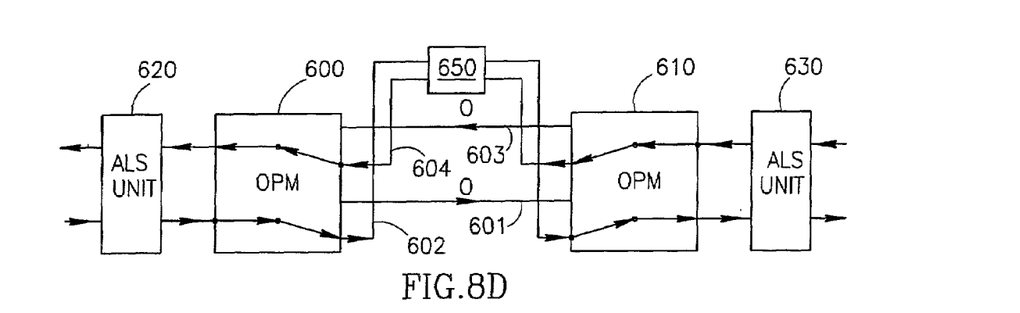

Following the second switching, traffic is transmitted to and from network element 650 (which may in turn also comprise similar OPM units, to allow further expansion of the network) via the alternative fibers 602 and 604. The direct transmission/reception of traffic between the network elements comprising OPM units 600 and 610 may still continue along the "O" fibers, 601 and 603. The entire operation is typically completed in less than 10 msec, and thus the LOS detection mechanism will not be triggered (an operation that typically requires about 500 msec).

It will be appreciated that the above-described methods may be varied in many ways, including but not limited to, changing the exact implementation used. It should also be appreciated that the above described description of methods and networks are to be interpreted as including network in which the methods are carried out and methods of using the network components.

The present invention has been described using non-limiting detailed descriptions of preferred embodiments thereof that are provided by way of example and are not intended to limit the scope of the invention. It should be understood that features described with respect to one embodiment may be used with other embodiments and that not all embodiments of the invention have all the features shown in a particular figure. Variations of embodiments described will occur to persons of the art. Furthermore, the terms "comprise", "include", "have" and their conjugates shall mean, when used in the claims "including but not necessarily limited to".

The invention claimed is:

1. An optical communication system comprising:
a plurality of optical transmitters;
a wave division multiplexer receiving outputs from said plurality of optical transmitters over a plurality of optical channels;
at least a first and a second optical links;
a first switching means operative to allow diversion of traffic from said first optical link to said second optical link;
a wave division demultiplexer capable of receiving an input from said wave division multiplexer over the first optical link;
determination means connected for determining whether the energy received at said input from said wave division multiplexer exceeds a pre-defined threshold;
a plurality of optical receivers, each receiving an input from the wave division demultiplexer;
a detector connected for detecting the energy being received by each of said optical receivers;
a detection means for detecting a loss of signal along the first optical link;
a second switching means operative to allow the wave division demultiplexer to receive input from the wave division multiplexer over the second optical link in response to detection of loss of signal along the first optical link.

* * * * *